United States Patent
Uusitalo et al.

(10) Patent No.: US 9,913,248 B2
(45) Date of Patent: Mar. 6, 2018

(54) METHOD AND APPARATUS FOR AGGREGATING DATA FOR TRANSMISSION

(71) Applicant: NOKIA CORPORATION, Espoo (FI)

(72) Inventors: Mikko A. Uusitalo, Helsinki (FI); Zexian Li, Espoo (FI); Iikka Keskitalo, Oulu (FI); Martti Moisio, Klaukkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/492,909

(22) Filed: Sep. 22, 2014

(65) Prior Publication Data

US 2016/0088588 A1    Mar. 24, 2016

(51) Int. Cl.
*H04W 68/00*    (2009.01)
*H04W 68/02*    (2009.01)
(Continued)

(52) U.S. Cl.
CPC .......... *H04W 68/02* (2013.01); *H04W 4/005* (2013.01); *H04W 4/006* (2013.01);
(Continued)

(58) Field of Classification Search
CPC ..... H04W 68/02; H04W 4/005; H04W 4/006; H04W 28/0215; H04W 72/1263; H04W 74/06; H04W 4/06; H04W 4/08
(Continued)

(56) References Cited

U.S. PATENT DOCUMENTS

| 6,721,334 B1 | 4/2004 | Ketcham |
| 7,002,470 B1 * | 2/2006 | Miao ................... G08B 25/009 340/539.1 |

(Continued)

FOREIGN PATENT DOCUMENTS

| GB | 2483752 A | 3/2012 |
| WO | 2013162494 A1 | 10/2013 |
| WO | 2015/170144 A1 | 11/2015 |

OTHER PUBLICATIONS

LG Electronics Inc., "Group Paging for MTC Devices", 3GPP TSG-RAN2 Meeting #71, R2-104878, Aug. 23-27, 2010, pp. 1-3.
(Continued)

*Primary Examiner* — Charles Appiah
*Assistant Examiner* — Alexander Yi
(74) *Attorney, Agent, or Firm* — Squire Patton Boggs (US) LLP

(57) ABSTRACT

A method and apparatus can be configured to receive a first data from a first transmitter. The first data comprises data to be forwarded by the apparatus. The method may also include triggering a polling of a group of transmitting nodes. The triggering may be based on the received first data. The group of transmitting nodes may comprise nodes from which data is to be aggregated. The method may also include waiting for a period of time to receive a second data from a second transmitter of the group of transmitting nodes. The second data may comprise data to be forwarded by the apparatus. The first transmitter and the second transmitter may share communication resources to communicate with the apparatus. The method may also include aggregating the first data and the second data. The method may also include forwarding the aggregated data.

18 Claims, 8 Drawing Sheets

(51) Int. Cl.
*H04W 4/00* (2018.01)
*H04W 74/06* (2009.01)
*H04W 28/02* (2009.01)
*H04W 72/12* (2009.01)
*H04W 4/06* (2009.01)
*H04W 4/08* (2009.01)

(52) U.S. Cl.
CPC ... *H04W 28/0215* (2013.01); *H04W 72/1263* (2013.01); *H04W 74/06* (2013.01); *H04W 4/06* (2013.01); *H04W 4/08* (2013.01)

(58) Field of Classification Search
USPC ...... 455/458, 500, 73; 340/539.22; 370/331; 375/133
See application file for complete search history.

(56) References Cited

U.S. PATENT DOCUMENTS

| | | | |
|---|---|---|---|
| 2005/0141596 A1* | 6/2005 | Black | H04B 1/715 375/133 |
| 2010/0265915 A1* | 10/2010 | Sun | H04W 36/0033 370/331 |
| 2011/0019756 A1* | 1/2011 | Chun | H04L 1/1685 375/260 |
| 2012/0076058 A1 | 3/2012 | Padmanabh et al. | |
| 2012/0078429 A1 | 3/2012 | Weston et al. | |
| 2012/0230178 A1 | 9/2012 | Wang et al. | |
| 2012/0244896 A1* | 9/2012 | Miscopein | H04W 28/06 455/500 |
| 2013/0136064 A1 | 5/2013 | Jamadagni et al. | |
| 2013/0136072 A1 | 5/2013 | Bachmann et al. | |
| 2014/0129866 A1* | 5/2014 | Hallman | H04L 67/12 713/340 |
| 2015/0208350 A1 | 7/2015 | Li et al. | |

OTHER PUBLICATIONS

3GPP TR 23.769 V0.2.0, "3rd Generation Partnership Project; Technical Specification Group Services and System Aspects; Group Based Enhancements;"(Release 13), pp. 1-17.

European Search Report application No. 15184232.5 dated Feb. 22, 2016.

Upadhyayula et al., "A Low-Latency and Energy-Efficient Algorithm for Convergecast in Wireless Sensor Neworks", GLOBECOM 2003, Dept. of Computer Science and Engineering, Arizona State University, Tempe, AZ 85287, pp. 3525-3530.

Nithyakalyani et al., Energy Efficient Data Aggregation using Voronoi based Genetic Clustering Algorithm in International Journal of Computer Applications, vol. 54, No. 4, Sep. 2012, pp. 37-41.

3GPP TR 23.887 V12.0.0 (Dec. 2013), 3rd Generation Partnership Project; Technical Specification Group Services and System Aspects; Study on Machine-Type Communications (MTC) and other mobile data applications communications enhancements (Release 12), 151 pgs.

3GPP TR 23.888 V11.0.0 (Sep. 2012), 3rd Generation Partnership Project; Technical Specification Group Services and System Aspects; System improvements for Machine-Type Communications (MTC) (Release 11), 165 pgs.

* cited by examiner

METHOD AND APPARATUS FOR AGGREGATING DATA FOR TRANSMISSION

BACKGROUND

Field

Embodiments of the invention relate to aggregating data for transmission.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include receiving, by a network node, a first data from a first transmitter. The first data may include data to be forwarded by the network node. The method may also include triggering a polling of a group of transmitting nodes. The triggering is based on the received first data. The group of transmitting nodes may include nodes from which data is to be aggregated. The method may also include waiting for a period of time to receive a second data from a second transmitter of the group of transmitting nodes. The second data may include data to be forwarded by the network node. The first transmitter and the second transmitter share communication resources to communicate with the network node. The method may also include aggregating the first data and the second data. The method may also include forwarding the aggregated data.

In the method of the first embodiment, the polling may include polling of sensors nearby the first transmitter or nearby other determined locations.

In the method of the first embodiment, the polling may include polling a distributed subset of nodes.

In the method of the first embodiment, the polling may include polling a random selection of nodes.

In the method of the first embodiment, the polling may include polling a set of nodes that have not been heard from the longest.

In the method of the first embodiment, the group may include transmitters that have corresponding transmitting periodicities that differ from each other less than a threshold amount, that relate to a same physical parameter, or are dependent on a same physical parameter.

In the method of the first embodiment, the receiving the first data may include receiving the first data by an evolved Node B from a first sensor. The receiving the second data may include receiving the second data by the evolved Node B from a second sensor.

In the method of the first embodiment, the waiting for a period of time may include waiting for a configurable, predetermined time.

In the method of the first embodiment, the first data and the second data are transmitted by the first transmitter and the second transmitter at scheduled times so as to not collide.

According to a second embodiment, an apparatus may include at least one processor. The apparatus may also include at least one memory including computer program code. The at least one memory and the computer program code may be configured, with the at least one processor, to cause the apparatus at least to receive a first data from a first transmitter. The first data may include data to be forwarded by the apparatus. The apparatus may also be caused to trigger a polling of a group of transmitting nodes, wherein the triggering is based on the received first data. The group of transmitting nodes may include nodes from which data is to be aggregated. The apparatus may also be caused to wait for a period of time to receive a second data from a second transmitter of the group of transmitting nodes. The second data may include data to be forwarded by the apparatus. The first transmitter and the second transmitter share communication resources to communicate with the apparatus. The apparatus may also be caused to aggregate the first data and the second data. The apparatus may also be caused to forward the aggregated data.

In the apparatus of the second embodiment, the polling may include polling of sensors nearby the first transmitter or nearby other determined locations.

In the apparatus of the second embodiment, the polling may include polling a distributed subset of nodes.

In the apparatus of the second embodiment, the polling may include polling a random selection of nodes.

In the apparatus of the second embodiment, the polling may include polling a set of nodes that have not been heard from the longest.

In the apparatus of the second embodiment, the group may include transmitters that have corresponding transmitting periodicities that differ from each other less than a threshold amount, that relate to a same physical parameter, or are dependent on a same physical parameter.

In the apparatus of the second embodiment, the receiving the first data may include receiving the first data by an evolved Node B from a first sensor, and the receiving the second data may include receiving the second data by the evolved Node B from a second sensor.

In the apparatus of the second embodiment, the waiting for a period of time may include waiting for a configurable, predetermined time.

In the apparatus of the second embodiment, the first data and the second data are transmitted by the first transmitter and the second transmitter at scheduled times so as to not collide.

According to a third embodiment, a computer program product may be embodied on a non-transitory computer readable medium. The computer program product may be configured to control a processor to perform a process including receiving, by a network node, a first data from a first transmitter. The first data may include data to be forwarded by the network node. The process may also include triggering a polling of a group of transmitting nodes, wherein the triggering is based on the received first data. The group of transmitting nodes may include nodes from which data is to be aggregated. The process may also include waiting for a period of time to receive a second data from a second transmitter of the group of transmitting nodes. The second data may include data to be forwarded by the network node. The first transmitter and the second transmitter share communication resources to communicate with the network node. The process may also include aggregating the first data and the second data. The process may also include forwarding the aggregated data.

BRIEF DESCRIPTION OF THE DRAWINGS

For proper understanding of the invention, reference should be made to the accompanying drawings, wherein.

DETAILED DESCRIPTION

Figure 1A:
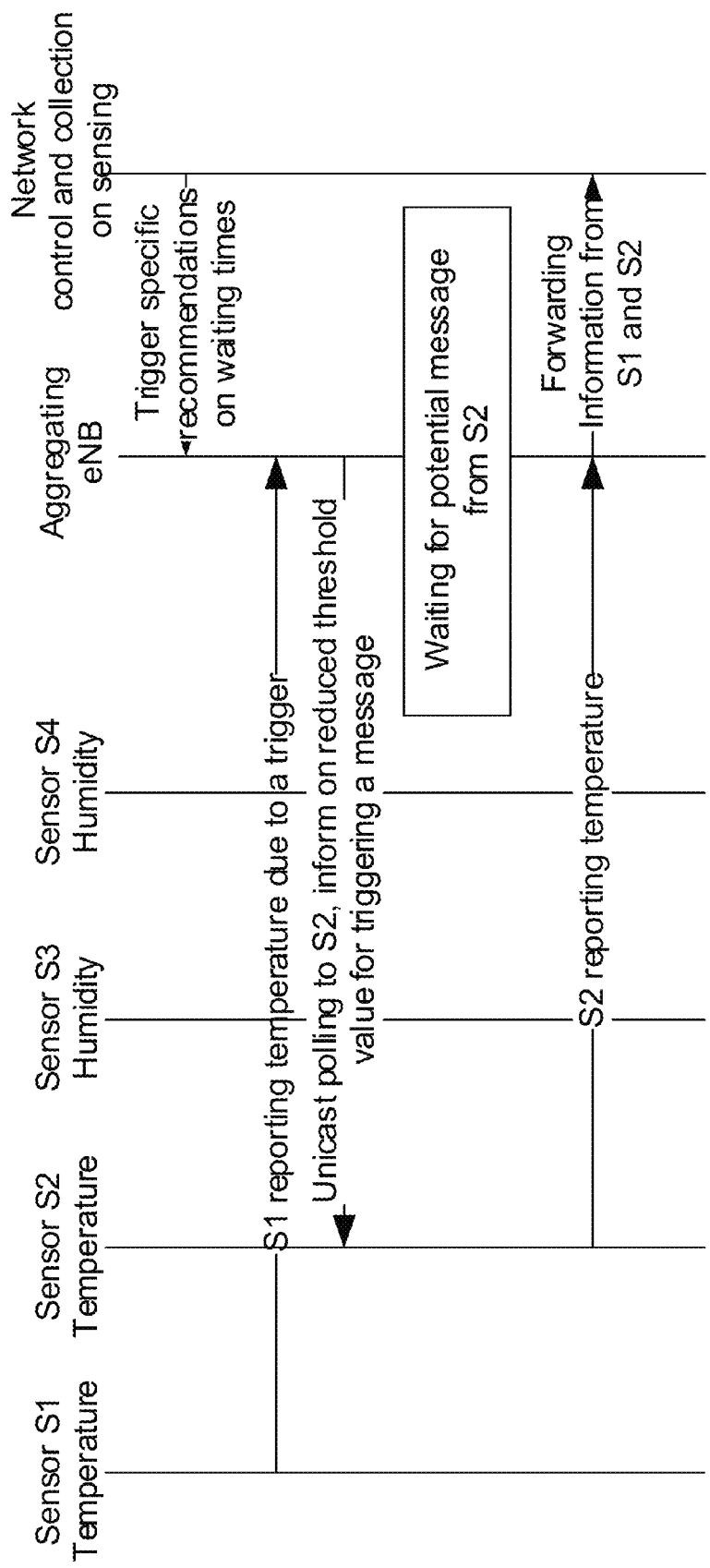
FIG. 1(a) illustrates polling and receiving trigger-specific waiting time information in accordance with certain embodiments of the present invention.

Embodiments of the present invention relate to aggregating data for transmission. Machine-to-Machine (M2M) communication technologies are rapidly gaining attention within the telecommunication industry. M2M communication technologies have recently begun to be deployed in smart grids, home networks, health-care environments, and vehicular-networking environments, for example. The increasing importance of deployment of M2M communication technologies is evidenced by the fact that one of the topics studied in Mobile-and-wireless-communications-Enablers-for-Twenty-Twenty-Information-Society (METIS) (under EU FP7 program, see https://www.metis2020.com/about-metis/) is directed to Massive Machine communications (MMC). M2M is increasingly recognized as an important aspect for future 5G systems.

One possible use case of M2M is for infrequent transmission of a small packet. When designing solutions for M2M communication, power consumption may be an important consideration.

With current implementations of 3GPP, there are ongoing efforts that are directed to implementing machine-type communication (MTC). So far, the efforts in 3GPP have mainly been focused on implementing MTC enhancements for Release 12. However, 3GPP systems may not be well-suited to use MTC to perform small-packet transmission.

In view of the above-described shortcomings, certain embodiments of the present invention may extend the current 3GPP procedures to efficiently support small-packet transmission.

A group of sensors or MTC user equipment (UEs) may share resources with each other when communicating with an evolved Node B (eNB) or a hub. The sensors or the MTC UEs may send their signaling messages (or payload data) to the eNB/hub at regular intervals. The signaling messages may also be sent upon occurrence of a triggering event. A trigger may occur, for example, if a monitored parameter (as measured by the sensors/UE) experiences a large enough change. The monitored parameter may correspond to a measured temperature or a measured humidity, for example. Each group of sensors or MTC UEs may have the same or similar application(s), and, consequently, similar traffic characteristics. Sensor/MTC terminals may have a client communicating with a network server via a wireless connection. A single group may use a shared/common radio resource (shared among group members) from which data may be routed to an aggregation node in RAN (i.e., the data is not directly routed to a server). The membership of the group may be based on application, destination application server, usage of common radio resources, or the like, where the membership may imply the usage of a common aggregation of uplink data. The group can be formed, for example based, on the terminal type or capabilities (e.g., specific sensor to measure a parameter, such as, temperature, humidity, acceleration, etc.), terminals running the same application, terminals being connected to a specific application server, terminals configured to use common radio resource, or the like If the transmissions are regular (and thus predictable), the transmissions (from the sensors/UE) may be scheduled so that the transmissions do not collide. For example, in accordance with a regular interval, the transmissions may occur at different instants in time right after each other. By configuring the transmissions to occur at different times, collisions between the transmissions may be avoided.

If the timing of the transmissions is determined to not be an efficient/desirable timing to transmit the transmissions, a signaling request to change the timing (of transmitting performed by the sensors or MTC UEs) may be transmitted. Transmitting a signaling request to change the timing may have similarities to the procedure for performing semi-persistent scheduling, but the present transmitting of the signaling request may correspond to a reservation for multiple different transmitters.

An access point (such as an eNB) and/or a UE may perform the function of aggregating information received from certain nodes, such as information received from different sensors. The UE and/or the access point may have generic roles with respect to the sensors, and the UE and/or the access point may be act as aggregators for many different types of sensors. For example, temperature and humidity sensors may be present at a particular location. The temperature and humidity sensors may represent two different types of sensors with different respective triggers for sending their data.

In the future, there may be an increased amount of sensors along with an increased amount of wireless communication between these sensors. This communication may need to be implemented as efficiently as possible in order to make the communication feasible.

A power-efficient method may support small packet transmission targeted to types of applications such as MMC, for example. This proposal may be implemented on a Radio-Access-Network (RAN) side. One possible technological problem relates to providing core-network support for small-packets transmission, and to providing an effective way to provide such core network support. Specifically, it may be difficult to design/enhance the current LTE RAN and core-network (CN) functionalities to support small packet transmission in the scenarios where there are a very large number of MTC-type of terminals and/or sensors having connection to a cellular network. The LTE RAN and the core network may not be able to handle the increased load of controlling every terminal in the manner that the controlling is currently performed. The RAN and CN capacity may not be able to cope with the load of the new types of terminals due to increased requirements to handle the increased signalling load. As such, the above-described proposal may need to properly address an increase in requirements and complexity in order to provide the necessary services and service quality for MTC terminals and MMC types of applications.

In the future, a large amount of machine-type communication may be expected to be implemented. When utilizing shared resources, both in communication via a radio interface and in communication via a connection between a RAN and a core network (CN), further resources for communication can be saved. Embodiments of the present invention are directed to saving these further resources.

Embodiments of the present invention schedule and aggregate transmitted information (such as sensor information, for example), or schedule/aggregate information from other devices (like an MTC terminal, for example). The information is scheduled/aggregated at an eNB before forwarding the information to a core network, in order to save resources used for communication. Similar principles can also be applied in case there is an intermediate aggregation node or a hub between the sensors/devices and the wireless network.

In certain embodiments of the present invention, an aggregation node/hub may perform the function of polling the sensors/devices/MTC terminals in order to collect relevant information to be sent to a core network/application server. The aggregation node/hub may trigger data transmission from sensors/devices/terminals which have not transmitted any information/data during an aggregation window, as described in more detail below.

Once an aggregation node (such as an eNB) receives a transmission that was triggered by an event, the eNB may wait for period of time to possibly receive additional transmissions before forwarding the received transmission, if it is known that some other sensors have a similar type of trigger or a similar periodicity as compared to the sensor that just transmitted data to the eNB (where the just-transmitted data corresponds to the above-described received transmission). A new timer can be used to specify a maximum waiting time for the eNB. This maximum time may be configurable.

The length of the collection time for receiving additional transmissions may depend on the application and the delay tolerance of the collected data. The time window may be either (semi-)static or dynamic. With static and semi-static windows, the amount of time can be per service/application. With dynamic windows, the amount of time may depend on the received data (some kind of analysis function may be needed).

Parameters for the aggregation (e.g., parameters for the time window) may come also from an Interworking Function (IWF) if the IWF has communicated with the (application) server. The Aggregation function may or may not have interaction with Radio-Resource-Control (RRC) layer.

FIG. 1(a) illustrates polling and receiving trigger-specific waiting time information in accordance with certain embodiments of the present invention. Specifically, FIG. 1(a) illustrates polling and receiving trigger-specific waiting time information from the network. The network may give guidance to the aggregating eNB regarding the waiting times and the used and lowered triggering conditions. Referring to FIG. 1(a), when the eNB receives information from temperature sensor S1, the eNB may poll for information from other temperature sensors, like S2. After this polling, the eNB may wait for a pre-defined time. If another sensor, like S2, sends information during this time, the information from both S1 and S2 may be sent/forwarded together by the aggregating eNB to the network.

Figure 1B:
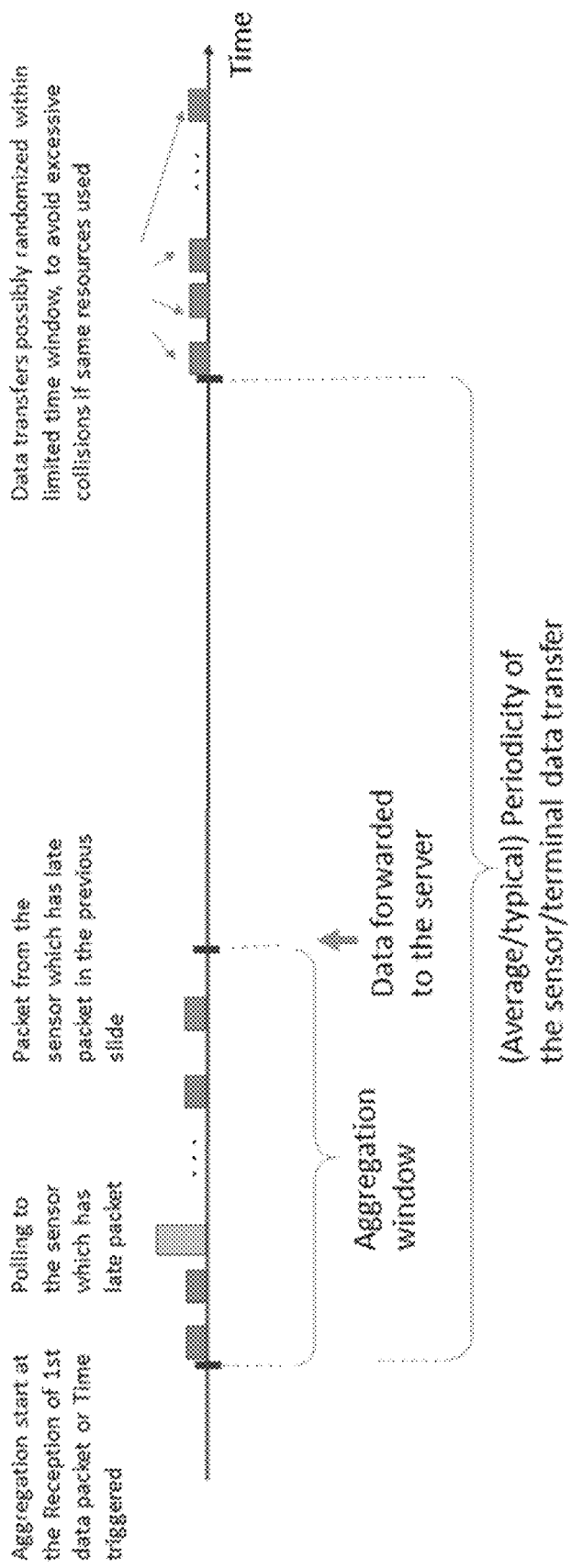
FIG. 1(b) further illustrates polling in accordance with certain embodiments of the present invention.

FIG. 1(b) further illustrates polling in accordance with certain embodiments of the present invention. As shown by FIG. 1(b), an aggregating eNB may receive data packets during an aggregation window. After receiving a first data packet from a first transmitter/sensor/terminal, the aggregating eNB may poll other transmitters/sensors/terminals. The polled transmitters/sensors/terminals can then transmit data packets to the aggregating eNB.

In certain embodiments of the present invention, after the eNB receives the data packets from one MTC device, the eNB can start a targeted polling procedure by which the eNB polls for information from other MTC devices. Polling can be specific to a certain group of devices, such as specific to temperature sensors, for example. The certain group may be formed based on certain characteristics of the devices, suitable to a particular purpose. The polling message can be sent via a broadcast, such as a multicast or a unicast broadcast.

Embodiments of the present invention may provide a trigger for polling and targeted polling. The polling may address those sensors/MTC terminals that belong to the above-described defined group. The aggregation function may be aware of the amount of received data, and may be aware of what could be expected from each defined sensor/MTC group. If data is not received from a sufficient number of terminals (there could be a threshold for the amount), the aggregation function may initiate polling, where the actual polling signaling is directed by the eNB with appropriate signaling. The eNB may direct the polling signaling using Radio-Resource-Control (RRC) messages, for example. The signaling may be a broadcast, multicast or unicast message.

If the sensors are triggered, the sensors may then send information, even if a normal triggering criteria is not met. "Normal triggering criteria" may refer to a time-based data transmission. If a sensor/terminal is "late" with its data transmission and is being polled, the sensor/terminal may modify the timer for the next transmission so that the next transmission will be within the desired time window. Then, subsequent polling (to that specific sensor/MTC) may no longer be needed.

The sent information (sent from the sensors) may then be included in the information forwarded by the eNB, to provide a more comprehensive amount of data relating to the triggered event. This arrangement provides a more comprehensive amount of information than just a simple activation of a node. When polling, the triggering criteria may be lowered as informed by the polling.

Preferences for the aggregation and urgency of sensor data may also be set at the MTC application either by the end user or by the UE, without active participation of the end user. In the latter case, this would be based on some pre-programmed principle. Preferences can be set by the end user via a user interface. Preferences may also be set by the UE itself. The UE may vary the preferences without active participation by the end user. In the latter case, the preferences may be varied by the UE based on some preprogrammed principle, to be either set by an existing program or to be set by the user beforehand.

The function(s) of an aggregation node may be configured by an application server, or the functions can be initialized as part of a RAN configuration. The configuration of the aggregation node may be determined by the application server directly or via (MTC) IWF (InterWorking Function), or, alternatively, determined by the Operation, Administration, and Maintenance (OAM) of the mobile network. The aggregation node may have a specific Internet Protocol (IP) address that is different from the CN gateways so that the data from a particular group of sensors/MTCs may be automatically routed to the aggregation node using implicit indication based on group membership. The aggregation function may then decide when and how the data is forwarded to the CN nodes.

Figure 2:
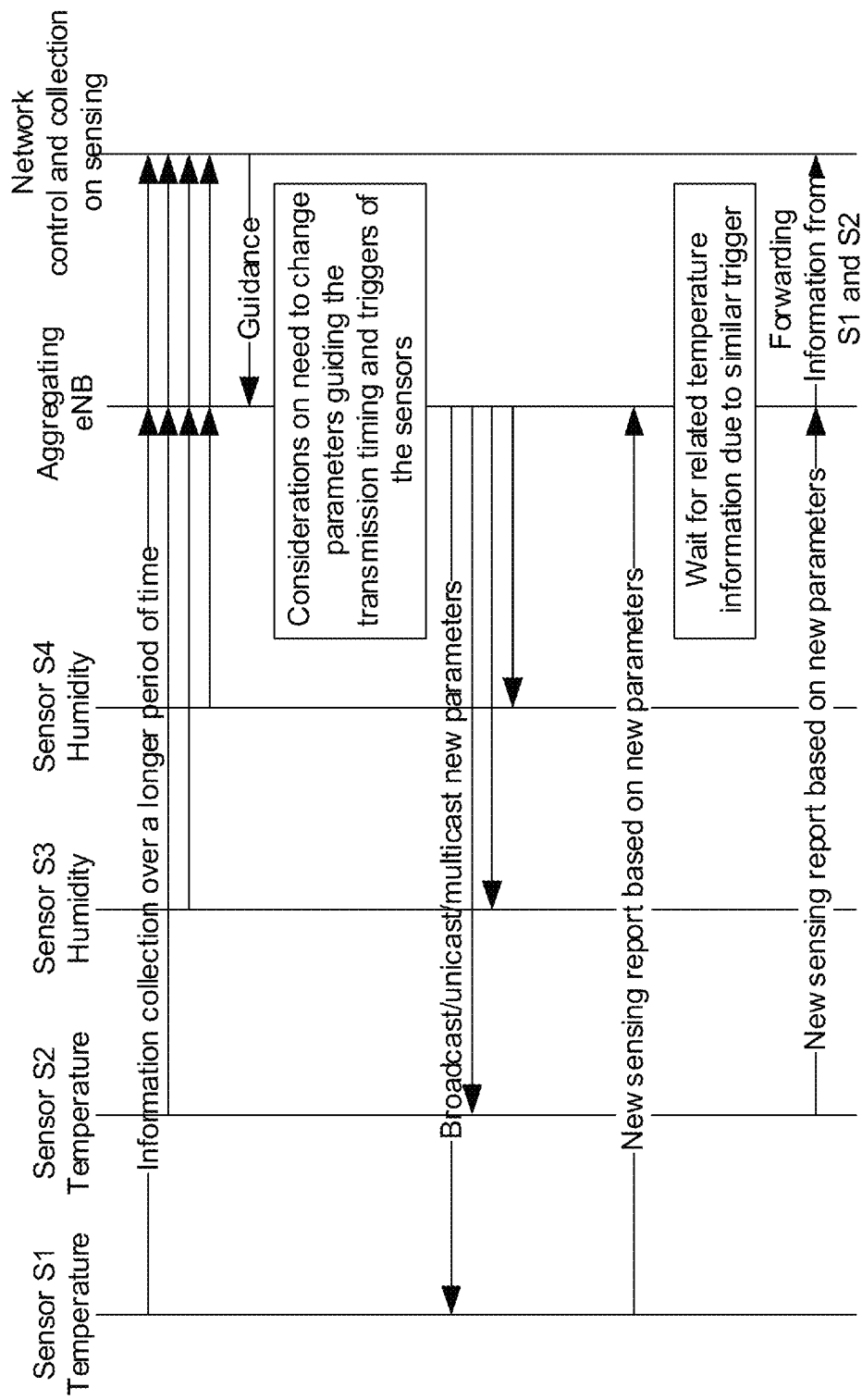
FIG. 2 illustrates waiting for sensor information in accordance with one embodiment of the present invention.

FIG. 2 illustrates waiting for sensor information in accordance with one embodiment. FIG. 2 illustrates waiting for sensor information from two sensors (S1 and S2), with both sensors having similar triggers related to temperature. Two other sensors, S3 and S4, may measure humidity. Data collection from the sensors can occur over a longer period of time, as shown by the top portion of FIG. 2, shown through four pieces of information transmitted from the four sensors via an aggregating eNB to the network. After a period of time, the aggregating eNB may determine whether there is any need to change the parameters relating to the transmission timing and the triggering of the sensors. The eNB may also receive some guidance relating to whether the parameters are to be changed from the network. The eNB may broadcast/multicast or unicast any new parameters to the sensors. Successive transmissions from the sensors may occur based upon the new parameters. Upon receiving information from temperature-related sensor S1, the eNB may wait for potential information from S2 due to similarities in the triggering mechanisms between S1 and S2. After a predetermined waiting time has elapsed, or after the eNB has received all of the information, the eNB may forward the aggregated information to the network.

Timing control information may be signaled by the eNB or aggregation node to the sensors/terminals, either by dedicated messages or by broadcast/multicast messages. Use of broadcast/multicast signaling may be preferable when there are a large number of sensors/terminals within the coverage area of the cell. The control information may include parameters, which may be used to determine the timing of when each sensor/terminal should send its data. The used parameters may be selected and configured in such a way that the data transmission from the sensors/terminals may be evenly spread or averaged over time. The eNB may have a fixed waiting period to collect a predictable amount of data (to be forwarded to the actual destination).

In another embodiment, a "back-off" timer may be configured, as described in more detail below. The configurations may be configured by the network. With these configurations, collisions of the data transmissions may be avoided. The "back-off" configuration may allow the eNB to assess how long of a time that the eNB has to wait until all or a predictable amount of terminals have sent their data. This option may be applicable, for example, in the event some telemetry devices send their measured data once per week or once per month. Back-off timers are typically used to randomize transmissions in order to avoid collisions between the multiple transmissions. For example, if a collision occurs between two transmissions, transmitters may start timers that have random values. Once the timers expire, re-transmission of each transmission occurs, probably without any collision between the transmissions.

In certain embodiments of the present invention, the network may also inform UEs and the access points of certain suitable times to wait for different types of triggers, depending on the amount of traffic and other operational factors of the network. At some intervals, UEs and access points may also inform the network and inform each other on the statistics on how they have received sensor information in groups. This information may be used to further optimize the correct length of the waiting times. Waiting times that are too long may be shortened if sufficient data can be collected with a shorter waiting time. Conversely, times that are too short could be extended in order to avoid excessive polling. An optimum waiting time may be time variant and may depend on the network load, data amount, or some other radio/traffic-related parameters.

As described above, after receiving a transmission, an access point/eNB may poll for information from all transmitters or from selected transmitters. The polling may be unicast or broadcast/multicast, depending on the known likelihood of linkages between the logic of the reasons to transmit.

Figure 3A:
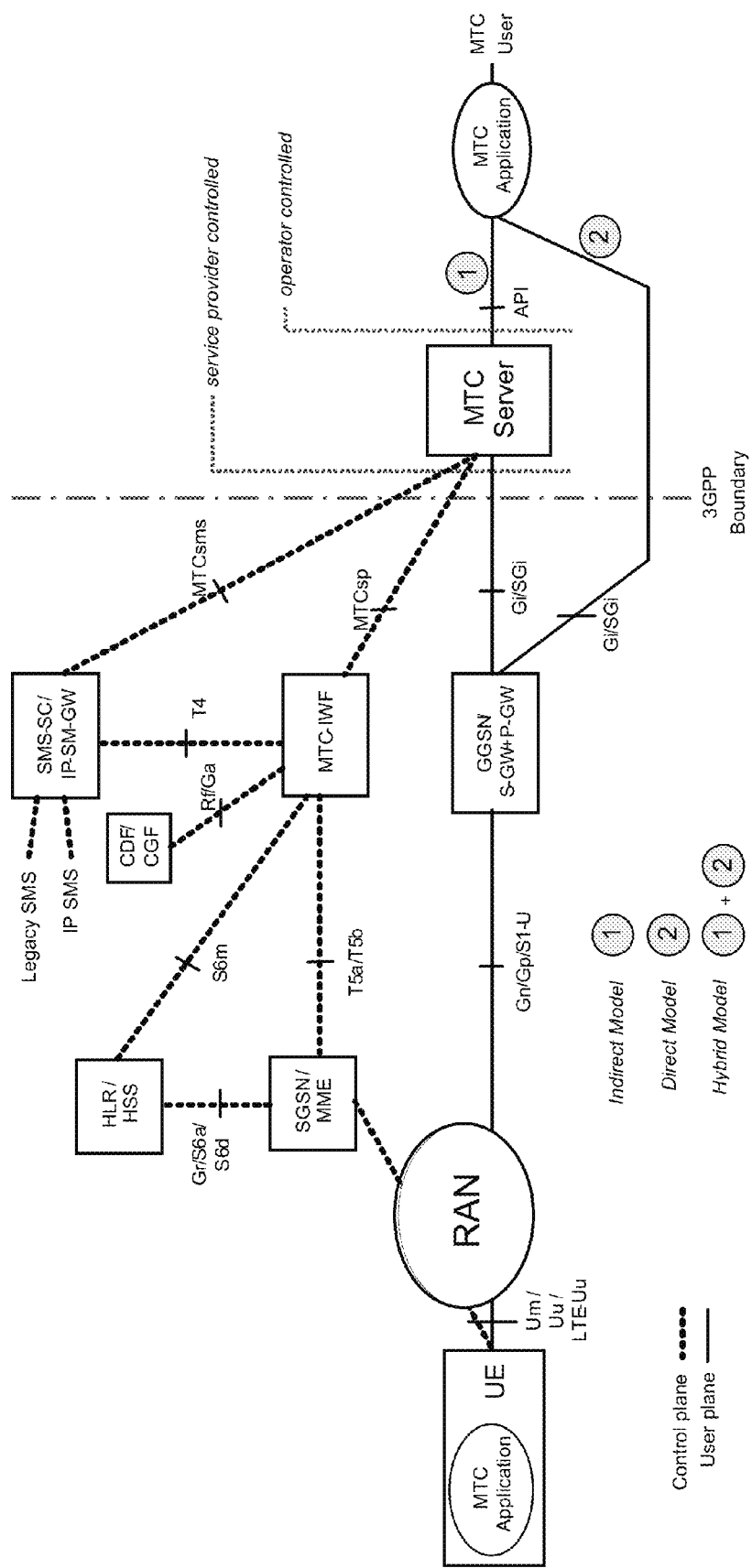
FIG. 3(a) illustrates an example architecture in accordance with embodiments of the present invention.

FIG. 3(a) illustrates an example architecture in accordance with embodiments of the present invention. Specifically, FIG. 3(a) illustrates an example architecture on the network that supports MTC terminals/applications. With certain embodiments of the present invention, the eNB may collect information on sensors and MTC UEs related to (1) the transmission patterns, (2) expected transmission times, and/or (3) logic behind the transmission time selections, like a relation to a particular type of a trigger. Based on need, the eNB may signal requests for adapting the transmission times.

Figure 3B:
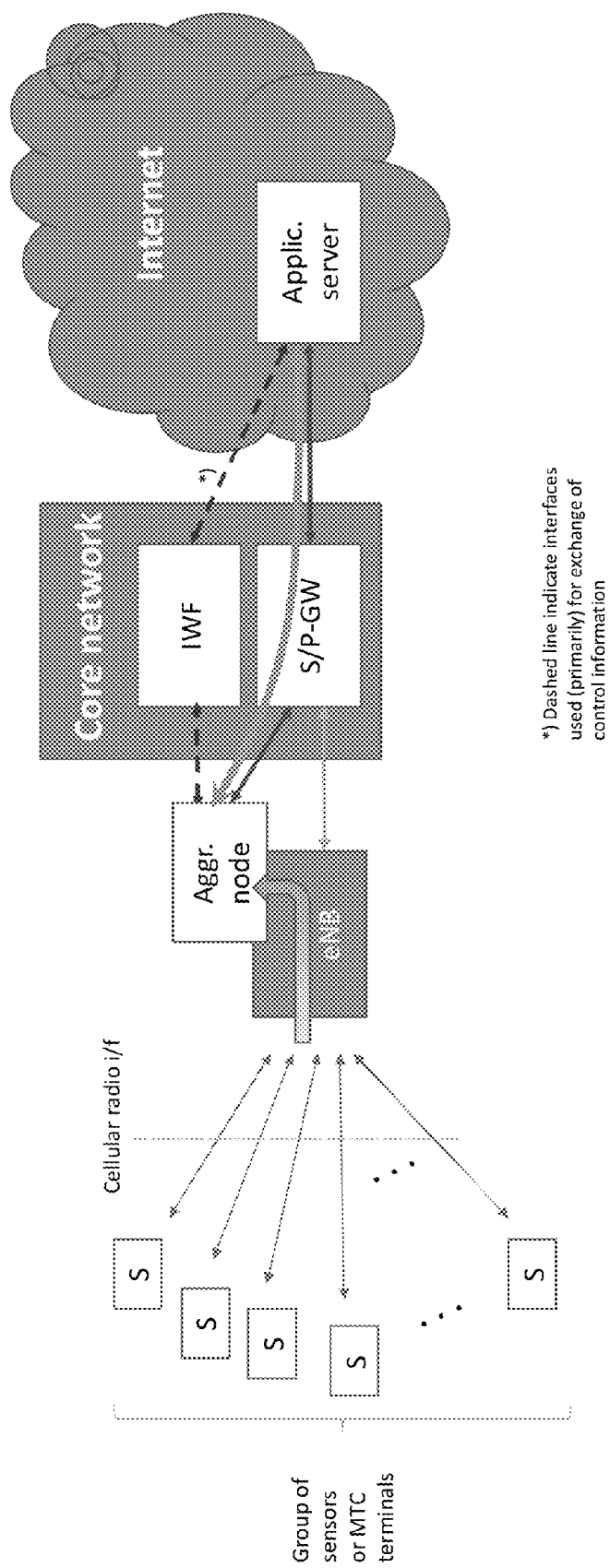
FIG. 3(b) illustrates another example architecture in accordance with embodiments of the present invention.

FIG. 3(b) illustrates an example architecture in accordance with embodiments of the present invention. As described above, an aggregation node/eNB may receive transmissions from a plurality of sensors/MTC-terminals. The aggregation node may also operate in conjunction with an IWF and/or an Serving/PDN Gateway (S/P-GW).

Figure 4:
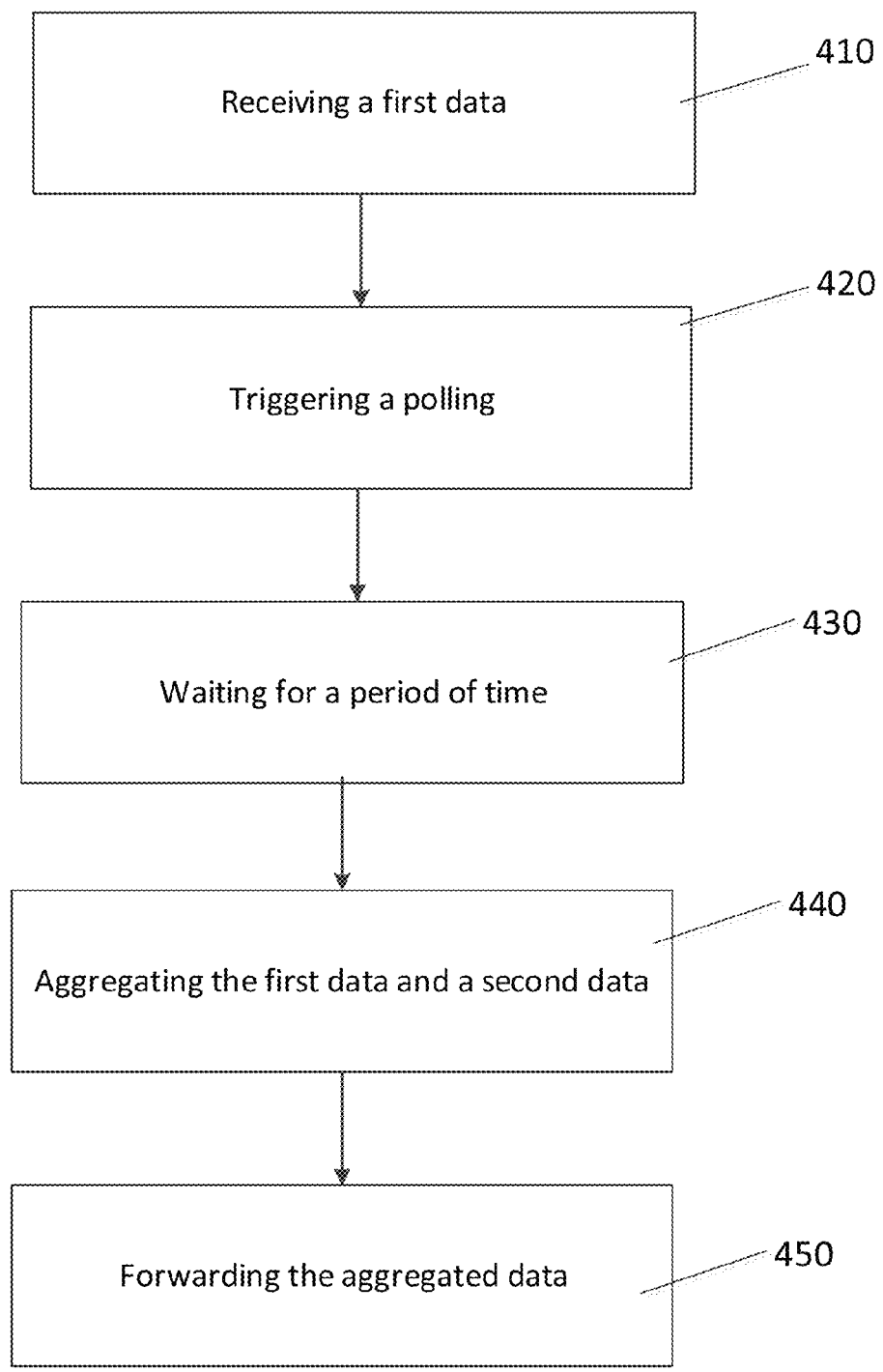
FIG. 4 illustrates a flowchart of a method in accordance with embodiments of the invention.

FIG. 4 illustrates a logic flow diagram of a method according to certain embodiments of the invention. The method illustrated in FIG. 4 may include, at 410, receiving, by a network node, a first data from a first transmitter. The first data may include data to be forwarded by the network node. The method may also include, at 420, triggering a polling of a group of transmitting nodes. The triggering may be based on the received first data. The group of transmitting nodes may comprise nodes from which data is to be aggregated. The method may also include, at 430, waiting for a period of time to receive a second data from a second transmitter of the group of transmitting nodes. The second data may include data to be forwarded by the network node. The first transmitter and the second transmitter share communication resources to communicate with the network node. The method may also include, at 440, aggregating the first data and the second data. The method may also include, at 450, forwarding the aggregated data.

Figure 5:
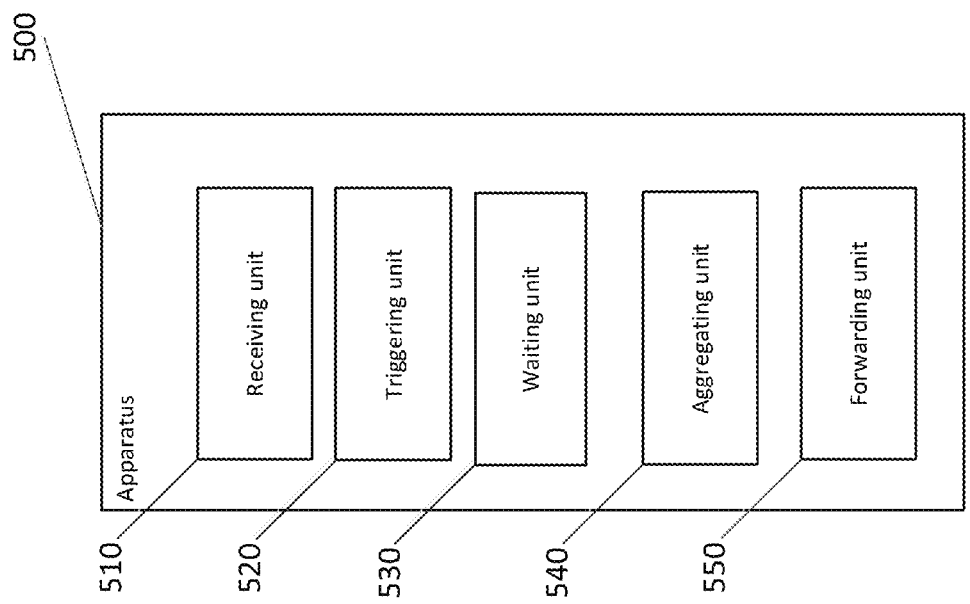
FIG. 5 illustrates an apparatus in accordance with embodiments of the invention.

FIG. 5 illustrates an apparatus in accordance with one embodiment. Apparatus 500 may comprise a receiving unit 510 that receives a first data from a first transmitter. The first data includes data to be forwarded by the network node. Apparatus 500 also includes a triggering unit 520 that triggers a polling of a group of transmitting nodes. The triggering may be based on the received first data. The group of transmitting nodes comprise nodes from which data is to be aggregated. Apparatus 500 may also include a waiting unit 530 that waits for a period of time to receive a second data from a second transmitter of the group of transmitting nodes. The second data includes data to be forwarded by the network node, and the first transmitter and the second transmitter share communication resources to communicate with apparatus 500. Apparatus 500 also includes an aggregating unit 540 that aggregates the first data and the second data. Apparatus 500 also includes a forwarding unit 550 that forwards the aggregated data.

Figure 6:
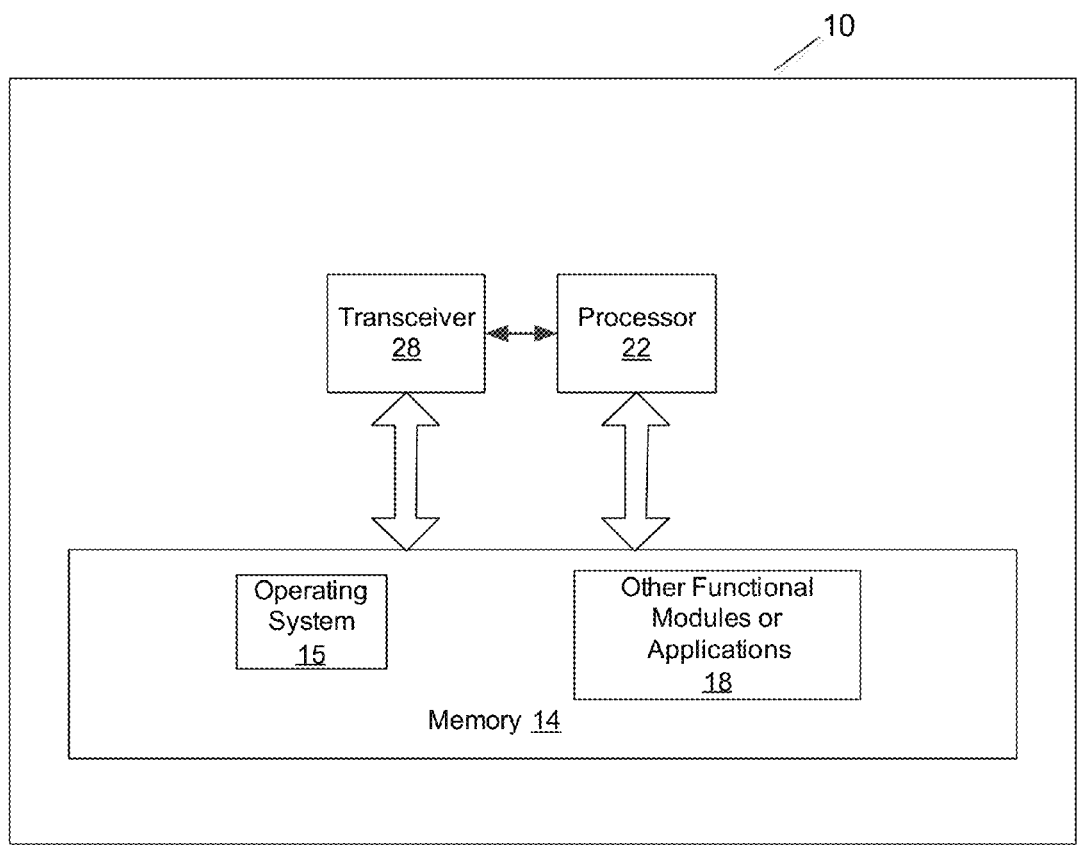
FIG. 6 illustrates an apparatus in accordance with embodiments of the invention.

FIG. 6 illustrates an apparatus 10 according to embodiments of the invention. Apparatus 10 can be a device, such as a sensor or a user equipment, for example. In other embodiments, apparatus 10 can be a base station and/or access point, for example.

Apparatus 10 can comprise a processor 22 for processing information and executing instructions or operations. Processor 22 can be any type of general or specific purpose processor. While a single processor 22 is shown in FIG. 6, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources.

In certain embodiments, memory 14 stores software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving, by a network node, a first data from a first transmitter, wherein the first data comprises sensor information related to an event to be forwarded by the network node;
triggering, by the network node, a transmission of a polling message to a specific group of wireless transmitting nodes among a plurality of groups, wherein the triggering is based on the received first data comprising the sensor information related to the event, and the group of transmitting nodes comprise nodes from which data is to be aggregated;
waiting for a dynamic period of time, based on a delay tolerance of the first data, to receive a second data from a second transmitter of the group of transmitting nodes, when the second transmitter has a similar type of trigger or a similar periodicity as the first transmitter, and wherein the second data comprises sensor information related to the event to be forwarded by the network node, and
the first transmitter and the second transmitter share communication resources to communicate with the network node;
aggregating the first data received from the first transmitter and the second data received from the second transmitter; and
forwarding the aggregated data from the network node to a network entity.

2. The method according to claim 1, wherein the transmission of the polling message comprises at least one of transmitting to sensors nearby the first transmitter or nearby other determined locations, transmitting to a distributed subset of nodes, transmitting to a random selection of nodes, and transmitting to a set of nodes that have not been heard from the longest.

3. The method according to claim 1, wherein the group comprises transmitters that have corresponding transmitting periodicities that differ from each other less than a threshold amount, that relate to a same physical parameter, or are dependent on a same physical parameter.

4. The method according to claim 1, wherein the receiving the first data comprises receiving the first data by an evolved Node B from a first sensor, and the receiving the second data comprises receiving the second data by the evolved Node B from a second sensor.

5. The method according to claim 1, wherein the first data and the second data are transmitted by the first transmitter and the second transmitter at scheduled times so as to not collide.

6. An apparatus, comprising:
at least one processor; and at least one memory including computer program code, the at least one memory and the computer program code configured, with the at least one processor, to cause the apparatus at least to:
receive, by a network node, a first data from a first transmitter, wherein the first data comprises sensor information related to an event to be forwarded by the network node;
trigger, by the network node, a transmission of a polling message to a specific group of wireless transmitting nodes among a plurality of groups, wherein the triggering is based on the received first data comprising the sensor information related to the event, and the group of transmitting nodes comprise nodes from which data is to be aggregated;

wait for a dynamic period of time, based on a delay tolerance of the first data, to receive a second data from a second transmitter of the group of transmitting nodes, when the second transmitter has a similar type of trigger or a similar periodicity as the first transmitter, and wherein the second data comprises sensor information related to the event to be forwarded by the network node, and the first transmitter and the second transmitter share communication resources to communicate with the network node;

aggregate the first data received from the first transmitter and the second data received from the second transmitter; and forward the aggregated data from the network node to a network entity.

7. The apparatus according to claim 6, wherein the transmission of the polling message comprises at least one of transmitting to sensors nearby the first transmitter or nearby other determined locations, transmitting to a distributed subset of nodes, transmitting to a random selection of nodes, and transmitting to a set of nodes that have not been heard from the longest.

8. The apparatus according to claim 6, wherein the group comprises transmitters that have corresponding transmitting periodicities that differ from each other less than a threshold amount, that relate to a same physical parameter, or are dependent on a same physical parameter.

9. The apparatus according to claim 6, wherein the receiving the first data comprises receiving the first data by an evolved Node B from a first sensor, and the receiving the second data comprises receiving the second data by the evolved Node B from a second sensor.

10. The apparatus according to claim 6, wherein the first data and the second data are transmitted by the first transmitter and the second transmitter at scheduled times so as to not collide.

11. A computer program product, embodied on a non-transitory computer readable medium, the computer program product configured to control a processor to perform a process comprising:
    receiving, by a network node, a first data from a first transmitter, wherein the first data comprises sensor information related to an event to be forwarded by the network node;
    triggering, by the network node, a transmission of a polling message to a specific group of wireless transmitting nodes among a plurality of groups, wherein the triggering is based on the received first data comprising the sensor information related to the event, and the group of transmitting nodes comprise nodes from which data is to be aggregated;
    waiting for a dynamic period of time, based on a delay tolerance of the first data, to receive a second data from a second transmitter of the group of transmitting nodes, when the second transmitter has a similar type of trigger or a similar periodicity as the first transmitter, and wherein the second data comprises sensor information related to the event to be forwarded by the network node, and
    the first transmitter and the second transmitter share communication resources to communicate with the network node;
    aggregating the first data received from the first transmitter and the second data received from the second transmitter; and
    forwarding the aggregated data from the network node to a network entity.

12. The computer program product according to claim 11, wherein the transmission of the polling message comprises at least one of transmitting to sensors nearby the first transmitter or nearby other determined locations, transmitting to a distributed subset of nodes, transmitting to a random selection of nodes, and transmitting to a set of nodes that have not been heard from the longest.

13. The computer program product according to claim 11, wherein the group comprises transmitters that have corresponding transmitting periodicities that differ from each other less than a threshold amount, that relate to a same physical parameter, or are dependent on a same physical parameter.

14. The computer program product according to claim 11, wherein the receiving the first data comprises receiving the first data by an evolved Node B from a first sensor, and the receiving the second data comprises receiving the second data by the evolved Node B from a second sensor.

15. The computer program product according to claim 11, wherein the first data and the second data are transmitted by the first transmitter and the second transmitter at scheduled times so as to not collide.

16. The method according to claim 1, further comprising:
    waiting for a static or semi-static period of time, wherein the static or semi-static period of time is determined based on a type of application of the first transmitter.

17. The apparatus according to claim 6, the at least one memory and the computer program code configured, with the at least one processor, to cause the apparatus at least to:
    wait for a static or semi-static period of time, wherein the static or semi-static period of time is determined based on a type of application of the first transmitter.

18. The computer program product according to claim 11, wherein the computer program product is configured to control the processor to:
    wait for a static or semi-static period of time, wherein the static or semi-static period of time is determined based on a type of application of the first transmitter.

* * * * *